(12) United States Patent
Fujihara et al.

(10) Patent No.: US 8,129,058 B2
(45) Date of Patent: Mar. 6, 2012

(54) FUEL CELL SYSTEM

(75) Inventors: Seiji Fujihara, Osaka (JP); Kunihiro Ukai, Nara (JP); Yukimune Kani, Osaka (JP); Hidenobu Wakita, Kyoto (JP)

(73) Assignee: Panasonic Corporation, Osaka (JP)

( * ) Notice: Subject to any disclaimer, the term of this patent is extended or adjusted under 35 U.S.C. 154(b) by 695 days.

(21) Appl. No.: 12/160,417

(22) PCT Filed: Feb. 8, 2007

(86) PCT No.: PCT/JP2007/052213
§ 371 (c)(1),
(2), (4) Date: Jul. 9, 2008

(87) PCT Pub. No.: WO2007/091632
PCT Pub. Date: Aug. 16, 2007

(65) Prior Publication Data
US 2010/0221619 A1 Sep. 2, 2010

(30) Foreign Application Priority Data
Feb. 8, 2006 (JP) .................. 2006-030763

(51) Int. Cl.
*H01M 8/06* (2006.01)
*H01M 8/04* (2006.01)
*H01M 8/22* (2006.01)

(52) U.S. Cl. ......... 429/423; 429/420; 429/442; 429/444

(58) Field of Classification Search .................. 429/429, 429/425, 423, 431, 421, 410, 420, 408, 444, 429/505; 422/600; 48/61
See application file for complete search history.

(56) References Cited

U.S. PATENT DOCUMENTS
6,455,008 B1 9/2002 Aoyama et al.
(Continued)

FOREIGN PATENT DOCUMENTS
EP 1 369 946 A1 12/2003
(Continued)

OTHER PUBLICATIONS
Machine Translation of JP 2004-288387 A, Takagi et al., Oct. 14, 2004.*
(Continued)

*Primary Examiner* — Jonathan Crepeau
*Assistant Examiner* — Kenneth Douyette
(74) *Attorney, Agent, or Firm* — McDermott Will & Emery LLP

(57) ABSTRACT

The present invention is a fuel cell system comprising: a hydrogen generator including a reformer which has a reforming catalyst and carries out a reforming reaction using the reforming catalyst to generate a hydrogen-containing gas from a raw material, a shift converter which has a shift catalyst and carries out a shift reaction using the shift catalyst to decrease carbon monoxide in the hydrogen-containing gas, and a first temperature detector which detects a temperature of the shift converter; a fuel cell which uses the hydrogen-containing gas delivered from the hydrogen generator, to generate electric power; and a control unit, wherein: the control unit does not start delivering the hydrogen-containing gas from the hydrogen generator to the fuel cell when at least the temperature of the shift converter detected by the first temperature detector is not a stable determination temperature or higher; and the stable determination temperature is lower than a control temperature of the shift converter at the time of a normal operation.

7 Claims, 9 Drawing Sheets

U.S. PATENT DOCUMENTS

2003/0035983 A1 2/2003 Ukai et al.
2005/0129997 A1 6/2005 Maenishi et al.

FOREIGN PATENT DOCUMENTS

| | | |
|---|---|---|
| JP | 10-064571 | 3/1998 |
| JP | 11-149931 | 6/1999 |
| JP | 2000-203804 | 7/2000 |
| JP | 2001-180906 | 7/2001 |
| JP | 2002-100386 | 4/2002 |
| JP | 2002-124286 | 4/2002 |
| JP | 2003-277011 | 10/2003 |
| JP | 2004-185941 | 7/2004 |
| JP | 2004-256364 | 9/2004 |
| JP | 2004-288387 | 10/2004 |

OTHER PUBLICATIONS

Machine Translation of JP 2003-277011 A, Maenishi et al., Oct. 2, 2003.*

* cited by examiner

FUEL CELL SYSTEM

RELATED APPLICATIONS

This application is the U.S. National Phase under 35 U.S.C. §371 of International Application No. PCT/JP2007/052213, filed on Feb. 8, 2007, which in turn claims the benefit of Japanese Application No. 2006-030763, filed on Feb. 8, 2006, the disclosures of which Applications are incorporated by reference herein.

TECHNICAL FIELD

The present invention relates to a fuel cell system which uses a fuel cell to generate electric power.

BACKGROUND ART

A fuel cell capable of generating electric power with high efficiency even if the fuel cell is small has been developed as an electric power generator of a distributed energy supply source. However, means for supplying a hydrogen gas used as fuel during this electric power generation is not developed as a common infrastructure. Therefore, a hydrogen generator which carries out a steam-reforming reaction of a raw material obtained from an existing infrastructure, such as a city gas or LPG, to generate a hydrogen gas is typically disposed with the fuel cell.

A reformed gas containing the hydrogen gas obtained by the hydrogen generator through the steam-reforming reaction contains carbon dioxide and carbon monoxide derived from the raw material. Since the carbon monoxide deteriorates an electric power generation property of the fuel cell (especially, PAFC and PEFC) which utilizes the hydrogen gas, it is desirable that a concentration of the carbon monoxide in the reformed gas be decreased as low as possible. On this account, to decrease the concentration of the carbon monoxide, the hydrogen generator includes a shift converter section which carries out a shift reaction between the carbon monoxide and steam to generate the hydrogen gas and a purifier section which carries out a selective oxidation reaction between the carbon monoxide and an oxidizing agent, such as a very small amount of air, to oxidize the carbon monoxide. In respective reaction sections, a catalyst suitable for progressing the reaction is used. For example, a Ru catalyst and a Ni catalyst are used in a reformer section, a catalyst (hereinafter referred to as "copper-zinc catalyst") containing copper and zinc as major components and a precious metal-based catalyst are used in the shift converter section, and the Ru catalyst and the like are used in the purifier section.

Since the shift reaction between the carbon monoxide and the steam in the shift converter section is an exothermic reaction, it is desirable to carry out the reaction at low temperature to effectively decrease the carbon monoxide. However, in the case of carrying out the reaction at low temperature, a reaction rate becomes low, so that a large amount of catalysts are necessary to progress the reaction. Therefore, in the case of using a precious metal-based shift catalyst, catalyst durability is easily secured, and a device operating condition is simple, however, since the use amount of the precious metal becomes large, the catalyst cost increases, which is a demerit.

In contrast, in the case of using the copper-zinc catalyst as the catalyst of the shift converter, since copper and zinc that are comparatively common metals are used as the raw materials, the catalyst cost becomes cheaper than the precious metal-based catalyst. However, the copper-zinc catalyst has a problem in the resistance to oxidation. For example, a catalytic activity of the copper-zinc catalyst tends to deteriorate due to the oxidation caused by air, steam or the like. Therefore, in the case of using a catalyst, such as the copper-zinc catalyst, which is easily oxidized by air or steam, a method for filling a catalyst existing space in the hydrogen generator with an inactive gas, such as nitrogen, or a material gas, such as a city gas or LPG, is adopted to maintain the catalyst existing space in a reducing state during stopping of the operation.

However, even in the case of adopting such method, it is difficult to secure complete sealing during stopping of the hydrogen generator for a long period of time. Since mixing of air into the hydrogen generator is unavoidable, the oxidation of the copper-zinc catalyst occurs, deteriorating a catalytic ability.

Known is a method for automatically reducing the shift catalyst oxidized in a shift reactor which has been left for a long period of time (see Patent Document 1 for example). Moreover, known is a reforming device which reduces the shift catalyst by a reducing gas generated by a combustor, and automatically determines the degradation of the shift catalyst and processes it (see Patent Document 2 for example).

Patent Document 1: Japanese Laid-Open Patent Application Publication Hei 10-64571
Patent Document 2: Japanese Laid-Open Patent Application Publication 2002-124286

DISCLOSURE OF THE INVENTION

Problems to be Solved by the Invention

In the shift reactor disclosed in Patent Document 1, after confirming that indicated values of a thermometer disposed in the shift reactor and a thermometer disposed at an exit of the device do not increase, a flow rate set value of a raw fuel is increased in a stepwise manner, and a reduction operation is carried out. Therefore, there is a problem in that it takes time of start up the device. Also, in the reforming device disclosed in Patent Document 2, there is a problem in that it takes time to start up the device since a hydrogen-rich reformed gas generated by a CO removing section is supplied to a fuel cell section after an exit temperature of an evaporator has reached a predetermined temperature at which a steady operation can be carried out, and a reproducing time preset in accordance with the degree of degradation of the shift catalyst has passed.

The present invention was made in light of the above problems, and an object of the present invention is to provide a fuel cell system which can restore its performance in accordance with the degree of the degraded shift catalyst and can shorten its start-up time.

Means for Solving the Problems

In order to solve the above conventional problems, a fuel cell system of the present invention includes: a hydrogen generator including a reformer which has a reforming catalyst and carries out a reforming reaction using the reforming catalyst to generate a hydrogen-containing gas from a raw material, a shift converter which has a shift catalyst and carries out a shift reaction using the shift catalyst to decrease carbon monoxide in the hydrogen-containing gas, and a first temperature detector which detects a temperature of the shift converter; a fuel cell which uses the hydrogen-containing gas delivered from the hydrogen generator, to generate electric power; and a control unit, wherein: the control unit does not start delivering the hydrogen-containing gas from the hydrogen generator to the fuel cell when at least the temperature of the shift converter detected by the first temperature detector is not a stable determination temperature or higher; and the stable determination temperature is lower than a control temperature of the shift converter at the time of a normal operation.

With this, the start-up time of the fuel cell system can be shortened.

Moreover, in the fuel cell system of the present invention, the control unit may be configured to change the stable determination temperature in accordance with an operation stop period of the fuel cell system.

Moreover, the fuel cell system of the present invention may further include a storage unit which is adapted to store the stable determination temperature corresponding to the operation stop period, wherein the control unit may be configured to, after determining the operation stop period, change the stable determination temperature to a stable determination temperature, which corresponds to the determined operation stop period, based on a correspondence between the operation stop period stored in the storage unit and the stable determination temperature.

Moreover, in the fuel cell system of the present invention, the shift catalyst may be configured to contain copper or zinc.

Moreover, the fuel cell system of the present invention may further include a second temperature detector which detects a temperature of the reformer, wherein the control unit may be further configured not to start delivering the hydrogen-containing gas from the hydrogen generator to the fuel cell when the temperature of the reformer detected by the second temperature detector is not a reforming operating temperature or higher.

With this, hydrogen generated by the hydrogen generator can be stably supplied to the fuel cell.

Moreover, in the fuel cell system of the present invention, the stable determination temperature may be such a temperature of the shift converter that a concentration of the carbon monoxide in the hydrogen-containing gas is able to be decreased by the shift converter to an upper limit concentration or lower of the hydrogen-containing gas which is able to be supplied to the fuel cell.

Moreover, in the fuel cell system of the present invention, the control temperature may be a temperature in a ⅓ higher temperature range of such an entire temperature range that a concentration of the carbon monoxide in the hydrogen-containing gas is able to be decreased by the shift converter to an upper limit concentration or lower of the hydrogen-containing gas which is able to be supplied to the fuel cell; and the stable determination temperature may be a temperature in a lower temperature range that is the entire temperature range except for the ⅓ higher temperature range.

Moreover, in the fuel cell system of the present invention, the control temperature may be higher than a temperature at which a concentration of the carbon monoxide in the hydrogen-containing gas becomes minimum, in such an entire temperature range that the concentration of the carbon monoxide in the hydrogen-containing gas is able to be decreased by the shift converter to an upper limit concentration or lower of the hydrogen-containing gas which is able to be supplied to the fuel cell; and the stable determination temperature may be lower than the temperature at which the concentration of the carbon monoxide in the hydrogen-containing gas becomes minimum.

Effects of the Invention

In accordance with the fuel cell system of the present invention, the start-up time of the fuel cell system can be shortened by setting the temperature of the shift catalyst at the time of starting supplying hydrogen from the hydrogen generator to the fuel cell to the stable determination temperature that is lower than the temperature at the time of the normal operation. Moreover, the performance of the shift catalyst can be surely restored since the stable determination temperature is changed in accordance with the degree of degradation of the shift catalyst.

| Explanation of Reference Numbers | |
|---|---|
| 1 | hydrogen generator |
| 1a | hydrogen generator |
| 2 | material feed device |
| 3 | water supplying device |
| 4 | fuel cell |
| 5 | selective oxidation air supplying device |
| 6 | oxidizing gas supplying device |
| 7 | control unit |
| 8 | passage switching valve |
| 9 | fuel gas supplying passage |
| 10 | bypass passage |
| 11 | combustion heater |
| 12 | preheating evaporator |
| 13 | reformer |
| 14 | shift converter |
| 15 | purifier |
| 21 | central processing unit |
| 22 | storage section |
| 23 | operation input section |
| 24 | storage section |
| 31 | outer tube |
| 32 | inner tube |
| 33 | intermediate tube |
| 34 | material supplying opening |
| 35 | water supplying opening |
| 36 | gas passage |
| 37 | bottom plate |
| 38 | lid member |

-continued

Explanation of Reference Numbers

| | |
|---|---|
| 39 | lid member |
| 40 | attachment member |
| 41 | attachment member |
| 42 | reforming catalyst layer |
| 43 | reformed gas passage |
| 44 | heat exchanger |
| 45 | shift catalyst layer |
| 46 | shift heater |
| 47 | shift temperature detector (first temperature detector) |
| 48 | air mixing section |
| 49 | air supplying opening |
| 50 | selective oxidation catalyst |
| 51 | fuel gas exhaust port |
| 52 | burner |
| 53 | sirocco fan |
| 54 | exhaust gas passage |
| 55 | reforming temperature detector (second temperature detector) |
| 60 | selective oxidation temperature detector |
| 100 | fuel cell system |
| 100a | fuel cell system |

BEST MODE FOR CARRYING OUT THE INVENTION

Hereinafter, preferred embodiments of the present invention will be explained in reference to the drawings.

Embodiment 1

Figure 1:
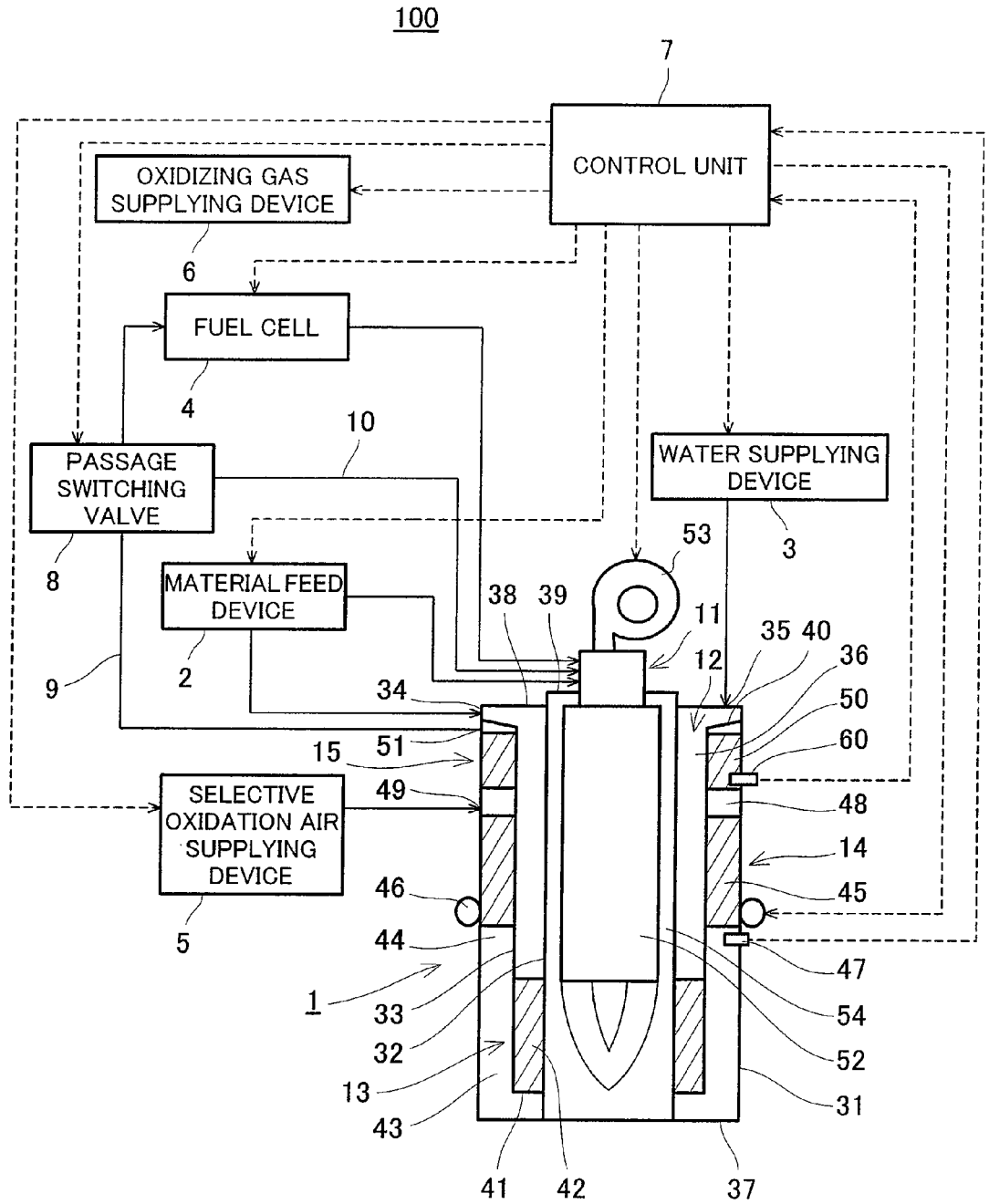
FIG. 1 is a schematic diagram showing the configuration of an entire fuel cell system according to Embodiment 1 of the present invention.

FIG. 1 is a schematic diagram showing the configuration of an entire fuel cell system according to Embodiment 1 of the present invention.

First, the configuration of the fuel cell system according to Embodiment 1 will be explained in reference to FIG. 1.

As shown in FIG. 1, a fuel cell system 100 according to Embodiment 1 includes a fuel cell 4, a material feed device 2, a water supplying device 3, a hydrogen generator 1, an oxidizing gas supplying device 6, a selective oxidation air supplying device 5, a passage switching valve 8 and a control unit 7.

The material feed device 2 includes: a pump (not shown) which supplies to the hydrogen generator 1 a raw material containing a compound comprised of at least carbon and hydrogen atoms; and a flow rate adjuster (not shown) capable of adjusting the supply amount of the raw material. Examples of the compound comprised of at least carbon and hydrogen atoms are hydrocarbon (such as methane, ethane and propane), alcohol (such as methanol), kerosene and LPG (liquefied petroleum gas). In the present embodiment, the material feed device 2 is configured to desulfurize a city gas, which is a natural gas supplied from a gas infrastructure as the raw material, to remove an odorant component and then to supply the city gas to the hydrogen generator 1.

The water supplying device 3 includes: a pump (not shown) which supplies tap water to a purifying device (not shown) including activated carbon and ion-exchange resin; a flow rate adjuster (not shown) capable of adjusting the supply amount of the tap water; and the purifying device. The water supplying device 3 supplies to the hydrogen generator 1 the water purified by the purifying device.

The hydrogen generator 1 includes a combustion heater 11, a preheating evaporator 12, a reformer 13, a shift converter 14 and a purifier 15. The hydrogen generator 1 carries out a reforming reaction between the raw material supplied from the material feed device 2 and the water supplied from the water supplying device 3 to generate hydrogen, and delivers the generated hydrogen to a fuel gas supplying passage 9.

The combustion heater 11 burns as a combustion fuel the raw material supplied from the material feed device 2, a fuel gas supplied from the hydrogen generator 1, or an off gas supplied from the fuel cell 4 to generate a flue gas.

The preheating evaporator 12 preheats the raw material supplied from the material feed device 2 and heats the water supplied from the water supplying device 3 to generate steam. The steam and the raw material are mixed, and this mixture gas is supplied to the reformer 13.

The reformer 13 carries out the reforming reaction between the raw material and steam in the supplied mixture gas by utilizing heat transmission of the flue gas generated by the combustion heater 11, thereby generating a hydrogen-rich reformed gas (hydrogen-containing gas). The generated reformed gas is supplied to the shift converter 14.

The shift converter 14 carries out the shift reaction between carbon monoxide and steam contained in the supplied reformed gas, to generate hydrogen and carbon dioxide. The reformed gas having been subjected to the shift reaction is mixed with the air supplied from the selective oxidation air supplying device 5, and this mixture gas is supplied to the purifier 15.

The purifier 15 carries out the selective reaction between the carbon monoxide and oxygen contained in the supplied mixture gas, to generate the fuel gas whose concentration of carbon monoxide is decreased to about 20 ppm. The generated fuel gas is supplied to an anode of the fuel cell 4 through the fuel gas supplying passage 9.

A cathode of the fuel cell 4 is supplied with an oxidizing gas containing oxygen from the oxidizing gas supplying device 6. The fuel cell 4 causes hydrogen in the fuel gas supplied to the anode and oxygen in the oxidizing gas to electrochemically react each other to generate electricity. The unreacted fuel gas is supplied to the combustion heater 11 of the hydrogen generator 1 as the off gas.

The passage switching valve 8 is disposed on a portion of the fuel gas supplying passage 9. The passage switching valve 8 is a three-way valve which switches between the fuel gas supplying passage 9 extending to the fuel cell 4 and a bypass passage 10 extending to the combustion heater 11 of the hydrogen generator 1 such that the fuel gas passage extending from the hydrogen generator 1 is connected to one of them. With this, in a case where the concentration of the hydrogen gas in the fuel gas supplied from the hydrogen generator 1 is low and the concentration of the carbon monoxide is not adequately decreased (for example, immediately after the start-up operation of the fuel cell system 100 is started), the fuel gas is supplied to the combustion heater 11 and is used as the combustion fuel. This improves energy efficiency.

The selective oxidation air supplying device 5 includes a diaphragm pump (not shown) and a flow rate adjuster (not shown) capable of adjusting the flow rate of air to be supplied to the hydrogen generator 1. The selective oxidation air supplying device 5 supplies the air to the reformed gas subjected to the shift reaction at the shift converter 14 and adjusts the flow rate of the air, thereby adjusting the temperature of the purifier 15.

Herein, the oxidizing gas supplying device 6 includes a blower (not shown) whose inlet port opens in the atmosphere and a flow rate adjuster (not shown) capable of adjusting the flow rate of the air to be supplied to the fuel cell 4. The oxidizing gas supplying device 6 supplies the oxidizing gas (air) containing oxygen to the cathode of the fuel cell 4. The oxidizing gas supplying device 6 may include a humidifier which humidifies the oxidizing gas.

Next, the control unit 7 constituting the fuel cell system 100 according to the present embodiment will be explained in reference to FIGS. 1 and 2.

Figure 2:
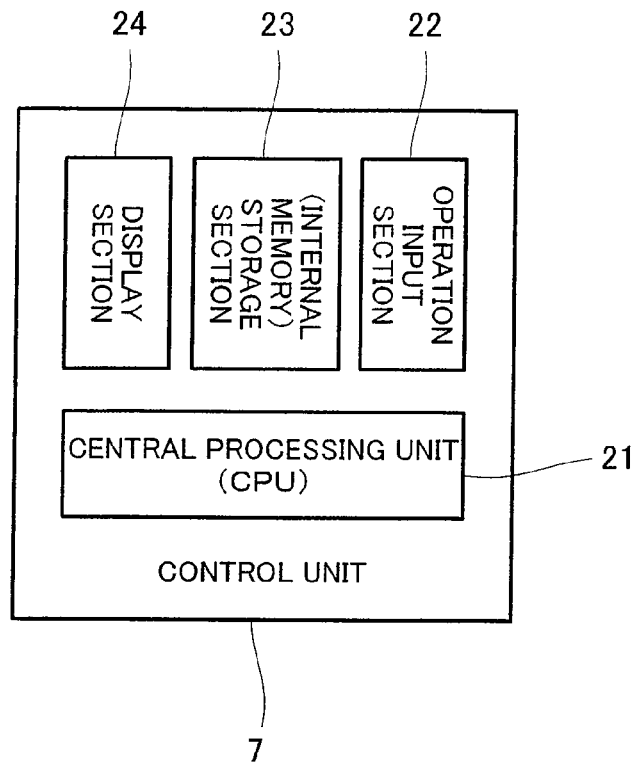
FIG. 2 is a schematic diagram showing the configuration of a control unit of the fuel cell system shown in FIG. 1.

FIG. 2 is a block diagram schematically showing the configuration of the control unit 7 shown in FIG. 1.

As shown in FIG. 2, the control unit 7 is constructed of a computer, such as a microcomputer, and includes a central processing unit (CPU) 21, a storage section (internal memory) 23 constructed of a semiconductor memory, an operation input section 22 and a display section 24. The central processing unit 21 reads out a predetermined control program stored in the storage section 23, to run the program, thereby carrying out various controls regarding the fuel cell system 100. Moreover, the central processing unit 21 processes data stored in the storage section 23 and data input from the operation input section 22.

In the present description, the control unit denotes not only a single control unit but also a group of a plurality of control units which cooperate to control the fuel cell system 100. Therefore, the control unit 7 does not have to be constructed of a single control unit, and may be constructed of a plurality of control units which are dispersively disposed and cooperate to control operations of the fuel cell system 100.

In the present embodiment, the storage section 23 constructed of the internal memory constitutes a storage unit. However, the storage unit is not limited to this, and may be, for example, an external storage device constructed of a storage medium (hard disk, flexible disk or the like) and its driving device (hard disk drive, flexible disk drive or the like), or a storage server connected through a communication network.

Next, a specific configuration of the hydrogen generator 1 will be explained in reference to FIG. 1.

The hydrogen generator 1 includes an outer tube 31 and an inner tube 32. An upper end surface of the outer tube 31 is closed by a flange-shaped lid member 38, and an upper end surface of the inner tube 32 is closed by a flange-shaped lid member 39. Meanwhile, lower end surfaces of the outer tube 31 and the inner tube 32 are closed by a bottom plate 37. An intermediate tube 33 is disposed in a tubular space formed between the outer tube 31 and the inner tube 32. An upper end of the intermediate tube 33 is connected to an inner peripheral portion of the outer tube 31 by a flange-shaped attachment member 40, and a lower end of the intermediate tube 33 is connected to an outer peripheral portion of the inner tube 32 by a flange-shaped attachment member 41 having a plurality of through holes (not shown) extending in a vertical direction.

A burner 52 is disposed in the inner tube 32 so as to penetrate the upper end surface of the inner tube 32 and extend downwardly. A tubular space between the burner 52 and the inner tube 32 forms an exhaust gas passage 54. A sirocco fan 53 which is adapted to supply combustion air is connected to the burner 52 via a suitable pipe. The burner 52 and the sirocco fan 53 constitute the above-described combustion heater 11. Moreover, the material feed device 2, the fuel cell 4 and the passage switching valve 8 are connected to the burner 52 via suitable pipes. The burner 52 is supplied with the combustion fuel from the material feed device 2 and the like (for example, the burner 52 is supplied with a raw material from the material feed device 2), and is supplied with the combustion air from the sirocco fan 53. The burner 52 burns the combustion fuel and the combustion air to generate the flue gas. The generated flue gas flows out from a tip end (lower end) of the burner 52, contacts a bottom wall of the inner tube 32, inverts, and flows upwardly in the exhaust gas passage 54. Moreover, an exhaust gas exhaust port (not shown) is disposed on the inner tube 32 which forms an upper end portion of the exhaust gas passage 54, and the flue gas having flowed in the exhaust gas passage 54 is discharged outside as the exhaust gas through the exhaust gas exhaust port.

A material supplying opening 34 is formed on an upper end portion of the outer tube 31. The material supplying opening 34 is connected to the material feed device 2 via a suitable pipe, and supplies to the preheating evaporator 12 the raw material supplied from the material feed device 2. Moreover, a water supplying opening 35 is formed on the lid member 38 which closes the upper end surface of the outer tube 31. The water supplying opening 35 is connected to the water supplying device 3 via a suitable pipe, and supplies to the preheating evaporator 12 the water purified by the water supplying device 2.

The preheating evaporator 12 is constructed of an upper portion of a tubular space formed between the outer tube 31 and the inner tube 32 and an upper portion of a tubular space formed between the inner tube 32 and the intermediate tube 33, and these spaces form a gas passage 36. In the preheating evaporator 12, the supplied material and water are heated and mixed, and the obtained mixture gas flows through the gas passage 36 to be supplied to the reformer 13.

The reformer 13 is constructed of a lower portion of the tubular space formed between the inner tube 32 and the intermediate tube 33 and a reforming catalyst layer 42 formed in this space. The reforming catalyst layer 42 is formed to be filled with a Ru-based reforming catalyst. The reformer 13 carries out a steam-reforming reaction between the supplied material and steam to generate the hydrogen-rich reformed gas. The generated reformed gas flows through a reformed gas passage 43.

The reformed gas passage 43 is constructed of a space formed between a downstream end of the reforming catalyst layer 42 and the bottom plate 37 and a tubular space which communicates with the space and is formed between the outer tube 31 and the intermediate tube 33. A part of the reformed gas passage 43 constitutes a heat exchanger 44, and the heat exchanger 44 carries out heat exchange between the material and water which flow through the reforming catalyst layer 42 and the gas passage 36 and the reformed gas. The reformed gas having been subjected to the heat exchange is supplied to the shift converter 14.

The shift converter 14 is constructed of a central portion of a tubular space formed between the outer tube 31 and the intermediate tube 33 and a shift catalyst layer 45 formed in the space. The shift catalyst layer 45 is formed to be filled with a Cu—Zn (copper-zinc) shift catalyst. A shift heater 46 is disposed on an outer wall surface of a portion of the outer tube 31 at which portion the shift catalyst layer 45 is disposed. Herein, the shift heater 46 is constructed of a sheath heater. Moreover, a shift temperature detector (first temperature detector) 47 is disposed upstream of the shift catalyst layer 45, and detects as the temperature of the shift converter 14 the temperature of the reformed gas supplied to the shift converter 14. Examples of the shift temperature detector 47 are temperature measuring devices, such as a thermocouple and a thermistor. The position of the shift temperature detector 47 is not limited to the upstream of the shift catalyst layer 45, and the shift temperature detector 47 may be disposed at the center of the shift catalyst layer 45 or downstream of the shift catalyst layer 45. Moreover, a plurality of the shift temperature detectors 47 may be disposed. Although the shift temperature detector 47 detects the temperature of the reformed gas as the temperature of the shift converter 14, it may directly detects the temperature of the shift catalyst layer 45 or the temperature of the outer wall surface of the portion of the outer tube 31 at which portion the shift catalyst layer 45 is disposed. The shift converter 14 carries out the shift reaction between the carbon monoxide and water (to be precise, steam) contained in the supplied reformed gas, to generate hydrogen, and decreases the concentration of the carbon monoxide to about 0.5% (dry gas basis). The reformed gas having been subjected to the shift reaction is supplied to an air mixing section 48.

The air mixing section 48 is disposed downstream of the shift converter 14 and is constructed of the tubular space formed between the outer tube 31 and the intermediate tube 33. An air supplying opening 49 is formed on the outer tube 31 which forms the air mixing section 48, and the air supplying opening 49 is connected to the selective oxidation air supplying device 5 via a suitable pipe. The air mixing section 48 is supplied with the air for the selective oxidation from the air supplying opening 49, and mixes the air with the reformed gas having been subjected to the shift reaction, and supplies the obtained mixture gas to the purifier 15.

The purifier 15 is disposed upstream of the shift converter 14 and is constructed of the tubular space formed between the outer tube 31 and the intermediate tube 33 and a selective oxidation catalyst layer 50 formed in the space. The selective oxidation catalyst layer 50 is formed to be filled with a Ru-based selective oxidation catalyst. A selective oxidation temperature detector 60 is disposed on an outer surface of a portion of the outer tube 31 at which portion the selective oxidation catalyst layer 50 is formed, and detects as the temperature of the purifier 15 the temperature of the reformed gas supplied to the purifier 15. Examples of the selective oxidation temperature detector 60 are temperature sensors, such as the thermocouple and the thermistor. The position of the selective oxidation temperature detector 60 is not limited to the center portion of the selective oxidation catalyst layer 50, and the selective oxidation temperature detector 60 may be disposed upstream of the selective oxidation catalyst layer 50 or downstream of the selective oxidation catalyst layer 50. Moreover, a plurality of the selective oxidation temperature detectors 60 may be disposed. Although the selective oxidation temperature detector 60 detects the temperature of the reformed gas as the temperature of the purifier 15, it may directly detects the temperature of the selective oxidation catalyst layer 50 or the temperature of the outer wall surface of the portion of the outer tube 31 at which portion the selective oxidation catalyst layer 50 is disposed. Herein, the temperature control of the purifier 15 is carried out by adjusting the flow rate of the air supplied from the selective oxidation air supplying device 5 to the air mixing section 48. However, the temperature control of the purifier 15 may carried out by an air-cooling fan disposed on the outer wall of the portion of the outer tube 31 at which portion the air mixing section 48 or the selective oxidation catalyst layer 50 is disposed.

The purifier 15 causes the carbon monoxide remaining in the reformed gas having been subjected to the shift reaction and the supplied oxygen to react each other to generate the fuel gas whose carbon monoxide is decreased to about 20 ppm or less.

At an upper end portion of the outer tube 31, a fuel gas exhaust port 51 is disposed downstream of the purifier 15. The fuel gas exhaust port 51 is connected to the fuel gas supplying passage 9, and delivers the fuel gas, having been subjected to the selective oxidation reaction, to the fuel gas supplying passage 9.

Next, operations of the fuel cell system according to Embodiment 1 will be explained in reference to FIG. 1.

The central processing unit 21 of the control unit 7 outputs an operation start control signal to start up the fuel cell system 100. Specifically, a part of the raw material is supplied as the combustion fuel from the material feed device 2 to the burner 52 at a predetermined supply amount, and the combustion air is supplied from the sirocco fan 53 to the burner 52 at a predetermined supply amount. The combustion fuel and the combustion air burn to generate the flue gas. The generated flue gas flows through the exhaust gas passage 54 to be discharged outside through the exhaust gas exhaust port (not shown). At this time, heat transmission from the flue gas heats the preheating evaporator 12 and the reformer 13. Moreover, the central processing unit 21 also outputs the operation start control signal to the shift heater 46 to start up the shift heater 46, and the shift heater 46 heats the shift converter 14.

In contrast, hydrocarbon (herein, the city gas which has been desulfurized to remove the odorant component) that is the raw material is supplied from the material feed device 2 through the material supplying opening 34 to the preheating evaporator 12, and the water for the reforming is supplied from the water supplying device 3 through the water supplying opening 35 to the preheating evaporator 12. At this time, the supply amount of the water is adjusted so as to contain oxygen molecules, the amount of which is three times as large as the amount of carbon atoms of the average composition of the raw material. In the present embodiment, since the city gas containing methane as the major component is used as the raw material, the amount of the water necessary to realize a state in which 3 moles of steam exist with respect to 1 mole of the supplied methane gas is supplied (a steam to carbon ratio (S/C) is 3). The preheating evaporator 12 heats the supplied water to generate steam, and mixes the steam with the heated raw material. The mixed steam and raw material flow through the gas passage 36 to be supplied to the heated reformer 13. The reformer 13 carries out the steam-reforming reaction between the steam and the raw material to generate the reformed gas containing the hydrogen, the carbon dioxide, the carbon monoxide, unreacted methane, and unreacted steam. The generated reformed gas flows through the reformed gas passage 43 from the downstream end of the reforming catalyst layer 42 to be supplied to the shift converter 14. At this time, the heat exchanger 44 constructed of a part of the reformed gas passage 43 carries out the heat exchange between the raw material and water flowing through the reforming catalyst layer 42 and the gas passage 36 and the reformed gas.

The shift catalyst of the shift converter 14 carries out the shift reaction of causing the carbon monoxide and the steam to react each other to generate the carbon dioxide and the hydrogen. Thus, the carbon monoxide in the reformed gas is decreased to about 0.5%. At this time, the shift converter 14 is heated by heat transmission from the reformed gas and the shift heater 46. The temperature of the shift converter 14 is detected by the shift temperature detector 47 at all times, and the detected temperature is transmitted to the central processing unit 21.

The reformed gas having been subjected to the shift reaction is supplied to the air mixing section 48. The air mixing section 48 mixes the reformed gas with the air supplied from the selective oxidation air supplying device 5 through the air supplying opening 49. The obtained mixture gas is supplied to the purifier 15.

The purifier 15 carries out the selective oxidation reaction between the carbon monoxide remaining in the reformed gas and oxygen in the air to generate the fuel gas whose concentration of the carbon monoxide is 20 ppm or less. The generated fuel gas is delivered from the fuel gas exhaust port 51 to the fuel gas supplying passage 9.

When the temperature detected by the shift temperature detector 47 is lower than the below-described stable determination temperature, the central processing unit 21 of the control unit 7 controls the passage switching valve 8 to supply the fuel gas to the burner 52 through the bypass passage 10. When the temperature detected by the shift temperature detector 47 is equal to or higher than the stable determination temperature, the central processing unit 21 of the control unit 7 controls the passage switching valve 8 to supply the fuel gas to the fuel cell 4 through the fuel gas supplying passage 9.

The fuel cell 4 uses hydrogen in the fuel gas and oxygen in the oxidizing gas supplied from the oxidizing gas supplying device 6, to generate electric power. An excessive fuel gas which has not been used in the fuel cell 4 is supplied to the hydrogen generator 1 (to be precise, the burner 52) as the off gas, and the burner 52 uses the off gas as the combustion fuel.

Next, the stable determination temperature of the fuel cell system 100 according to Embodiment 1 will be explained in detail in reference to FIG. 3.

Figure 3:
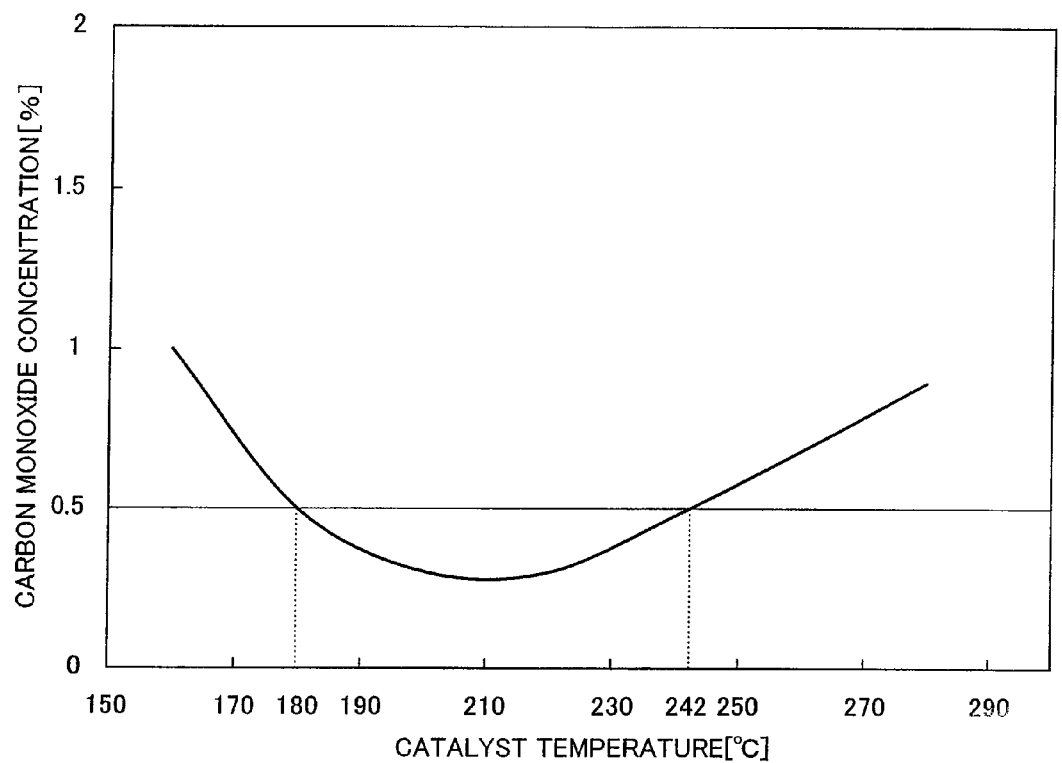
FIG. 3 shows results of an example of testing a catalyst characteristic (temperature characteristic) of a copper-zinc shift catalyst with respect to temperatures using a fixed-bed flow device.

FIG. 3 shows results of an example of testing a catalyst characteristic (temperature characteristic) of a copper-zinc shift catalyst (produced by Süd-Chemie) with respect to temperatures using a fixed-bed flow device.

The fixed-bed flow device was operated at a space velocity (SV) of 1,000/hour using a supply gas which contains 35% of steam and consists of 10% of carbon monoxide, 10% of carbon dioxide and 80% (dry gas basis) of hydrogen gas so that the S/C was set to 3 based on an assumption that the reforming reaction was carried out.

As shown in FIG. 3, the concentration of the carbon monoxide was decreased as the increase in temperature of the catalyst, and then was increased moderately in accordance with equilibrium in reaction.

It is clear from this result that to stably decrease the carbon monoxide to a reference value (0.5% for example) or less by the shift converter which uses the catalyst, it is desirable to operate the shift converter 14 in a temperature range from 230° C. to 240° C. in which the equilibrium in reaction is dominant, and the concentration of the carbon monoxide of the reformed gas delivered from the shift converter 14 hardly changes even if the flow rate of the supplied reformed gas increases or decreases. Meanwhile, the temperature at which the concentration of the carbon monoxide can be decreased to 0.5% or lower exists even at not more than 230° C.

Therefore, in the fuel cell system 100 according to Embodiment 1, after starting up the system, the stable determination temperature is set to 180° C., which is lower than a lower limit of a control temperature that is a temperature of the shift converter 14 at the time of a normal operation, and the control temperature is set to 230° C. to 240° C. The stable determination temperature is such a temperature of the shift converter 14 that the concentration of the carbon monoxide in the reformed gas (hydrogen-containing gas) can be decreased by the shift converter 14 to an upper limit concentration (0.5% for example) or lower of the reformed gas which can be supplied to the fuel cell 4.

Here, the normal operation is to operate the fuel cell system 100 in a state in which the temperature of the shift converter 14 is in a range of the control temperature.

With this setting, the fuel cell system 100 according to Embodiment 1 can shorten its start-up time.

Herein, the stable determination temperature is set to 180° C., and the control temperature is set to 230° C. to 240° C. However, the present embodiment is not limited to this. These values change depending on, for example, the type of the catalyst used as the shift catalyst, the use amount of the shift catalyst and the size of the hydrogen generator, and these conditions are determined as follows so as to correspond to the operating condition of the device. First, the relation between the concentration of the carbon monoxide and the catalyst temperature as shown in FIG. 3 is measured using the catalyst to be actually used, under conditions of the same SV and S/C as the operating condition of the hydrogen generator to be used. A target concentration (concentration of the carbon monoxide decreased by the shift converter) of the carbon monoxide at the exit of the shift converter is determined in consideration of an ability of the catalyst used by the purifier to decrease the carbon monoxide. Determining the target concentration of the carbon monoxide determines the upper and lower limits of the catalyst temperature at which the target concentration is realized. It is desirable that the stable determination temperature be as close as the lower limit temperature in light of the start-up property of the hydrogen generator, and it is desirable that the control temperature be as close as the upper limit temperature in light of the changes of the flow rate of the reformed gas supplied to the shift converter, or the stability of the concentration of the carbon monoxide in the reformed gas at the exit of the shift converter with respect to the changes of the temperature of the shift converter, that is, the stability of the device. Moreover, in order to realize a good start-up property of the hydrogen generator and a stable decrease in the concentration of the carbon monoxide, the stable determination temperature may be set to a temperature in a range from the lower limit temperature to a temperature at which the concentration of the carbon monoxide becomes a minimal value, and the control temperature may be set to a temperature in a range from the temperature at which the concentration of the carbon monoxide becomes the minimal value to the upper limit temperature, in which range the equilibrium in reaction becomes dominant with respect to the concentration of the carbon monoxide in the reformed gas at the exit of the shift converter.

Next, the start-up operation of the fuel cell system 100 according to Embodiment 1 will be explained in detail in reference to FIGS. 1, 2 and 4.

Figure 4:
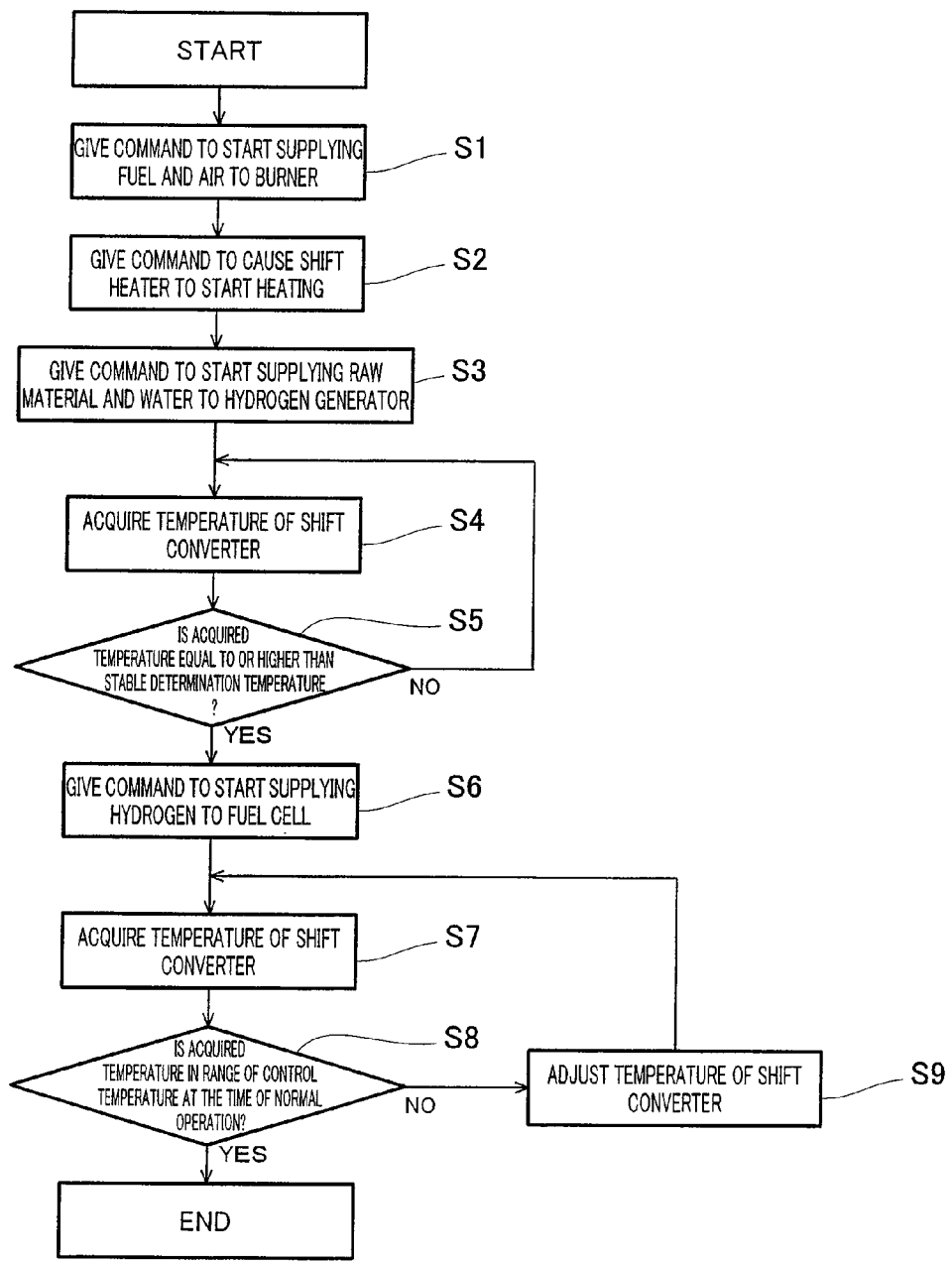
FIG. 4 is a flow chart schematically showing a content of a fuel cell system start-up operation program stored in the control unit of FIG. 1.

FIG. 4 is a flow chart schematically showing a content of a start-up operation program of the hydrogen generator 1 which is stored in the control unit 7.

First, the central processing unit 21 of the control unit 7 gives a command to the material feed device 2 to supply the raw material as the combustion fuel from the material feed device 2 to the burner 52 and a command to the sirocco fan 53 to supply the combustion air from the sirocco fan 53 to the burner 52 (Step S1). Then, the central processing unit 21 gives a command to cause the shift heater 46 to start heating (Step S2). Next, the central processing unit 21 gives a command to the material feed device 2 and the water supplying device 3 to supply the raw material and the water to the hydrogen generator 1 (to be precise, the preheating evaporator 12) (Step S3). The gas delivered from the hydrogen generator 1 is usually supplied to the burner 52 through the bypass passage 10. Thus, the burner 52 burns the combustion fuel and the combustible gas which has been supplied to the burner 52 through the bypass passage 10. Thus, the inside of the hydrogen generator 1 is heated by this combustion heat.

Next, the central processing unit 21 acquires the temperature of the shift converter 14 from the shift temperature detector 47 (Step S4). Then, the central processing unit 21 compares the stable determination temperature stored in the storage section 23 with the temperature of the shift converter 14 acquired in Step S4 (Step S5). When the acquired temperature of the shift converter 14 is lower than the stable determination temperature, the process returns to Step S4. Steps S4 and S5 are repeatedly carried out until the temperature of the shift converter 14 becomes the stable determination temperature or higher. When the acquired temperature of the shift converter 14 becomes the stable determination temperature or higher, the process proceeds to Step S6.

In Step S6, the central processing unit 21 gives a command to the passage switching valve 8 to switch to the passage connected to the fuel cell 4 as the passage of the fuel gas. Thus, the fuel cell 4 generates electric power. Then, the central processing unit 21 acquires the temperature of the shift converter 14 from the shift temperature detector 47 again (Step S7), and determines whether or not the acquired temperature of the shift converter 14 is in the range of the control temperature (Step S8). When the acquired temperature of the shift converter 14 is not in the range of the control temperature, the process proceeds to Step S9. In Step S9, the central processing unit 21 gives a command to the shift heater 46 to adjust the temperature of the shift converter 14 to be in the range of the control temperature. Steps S6 to S9 are repeatedly carried out until the temperature of the shift converter 14 becomes in the range of the control temperature. When the temperature of the shift converter 14 becomes in the range of the control temperature, the start-up operation program is terminated.

As above, in the fuel cell system according to Embodiment 1, the temperature of the shift converter 14 at the time of starting supplying the hydrogen from the hydrogen generator 1 to the fuel cell 4 is set to the stable determination temperature that is lower than the control temperature at the time of the normal operation. Thus, the start-up time of the fuel cell system can be shortened.

Next, a modification example of the fuel cell system 100 according to Embodiment 1 will be explained.

Modification Example 1

Figure 5:
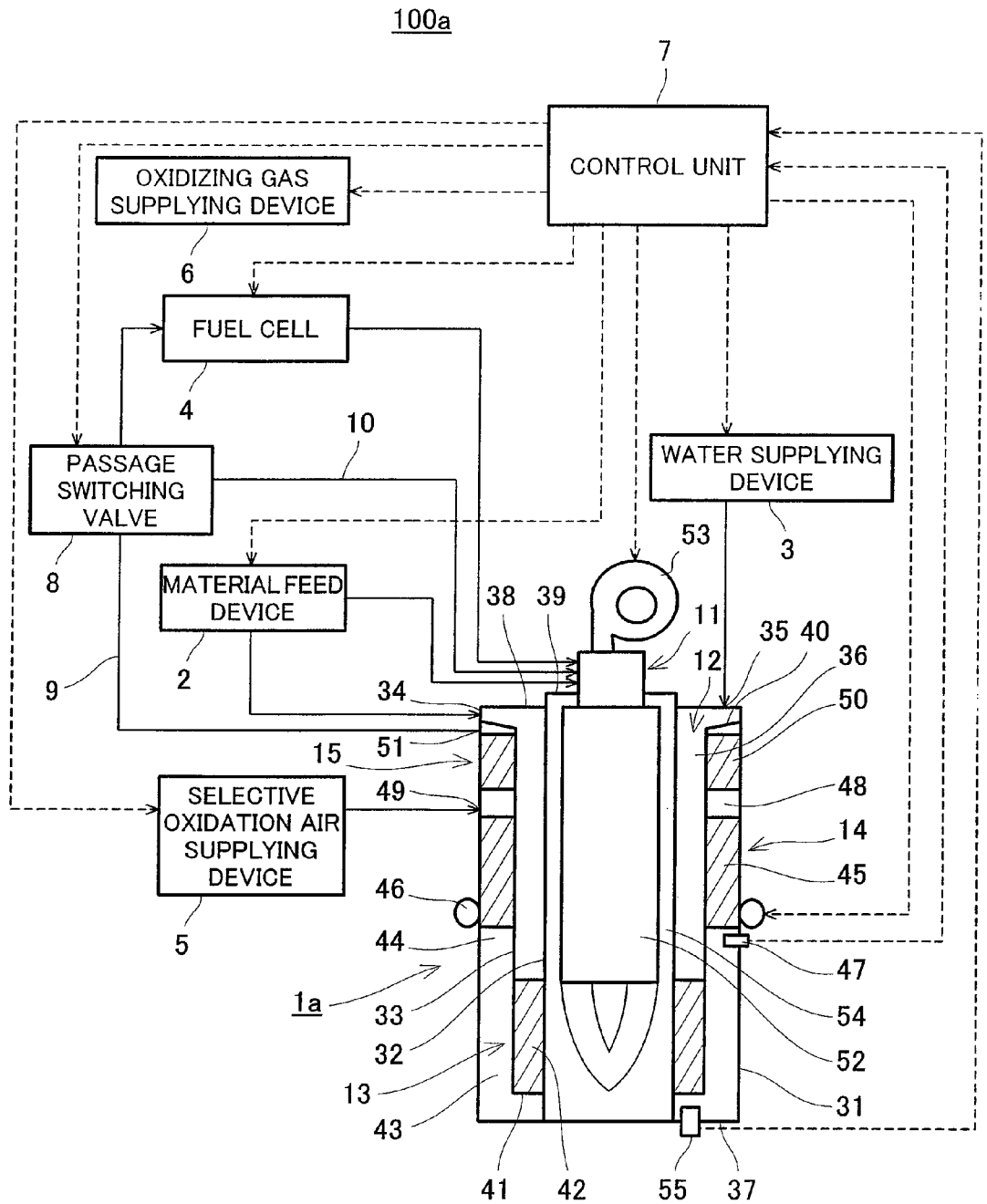
FIG. 5 is a schematic diagram showing a modification example of the fuel cell system shown in FIG. 1.

FIG. 5 is a schematic diagram showing the configuration of a fuel cell system 100a of Modification Example 1 of Embodiment 1. In the following explanation, same reference numbers are used for members that are the same as or corresponding to the members shown in FIG. 1, and same explanations thereof are omitted.

As shown in FIG. 5, in Modification Example 1, a reforming temperature detector (second temperature detector) 55 is disposed to detect the temperature of the reformer 13 of a hydrogen generator 1a. The reforming temperature detector 55 is disposed on an outer surface portion opposite a surface of the bottom plate 37 which surface collides with the flow of the reformed gas flowing out from the reforming catalyst layer 42, and is disposed to penetrate the bottom plate 37 in a vertical direction. Although the reforming temperature detector 55 detects the temperature of the reformed gas as the temperature of the reformer 13, it may directly detect the temperature of the reforming catalyst layer 42 or the temperature of the outer wall surface of the outer tube 31 forming the reformed gas passage 43 through which the reformed gas flows. Examples of the reforming temperature detector 55 are temperature sensors, such as the thermocouple and the thermistor.

Next, the start-up operation of the fuel cell system 100a of Modification Example 1 will be explained in reference to FIGS. 5 and 6. Since Steps S1 to S3 are the same as those of FIG. 4, explanations thereof are omitted.

Figure 6:
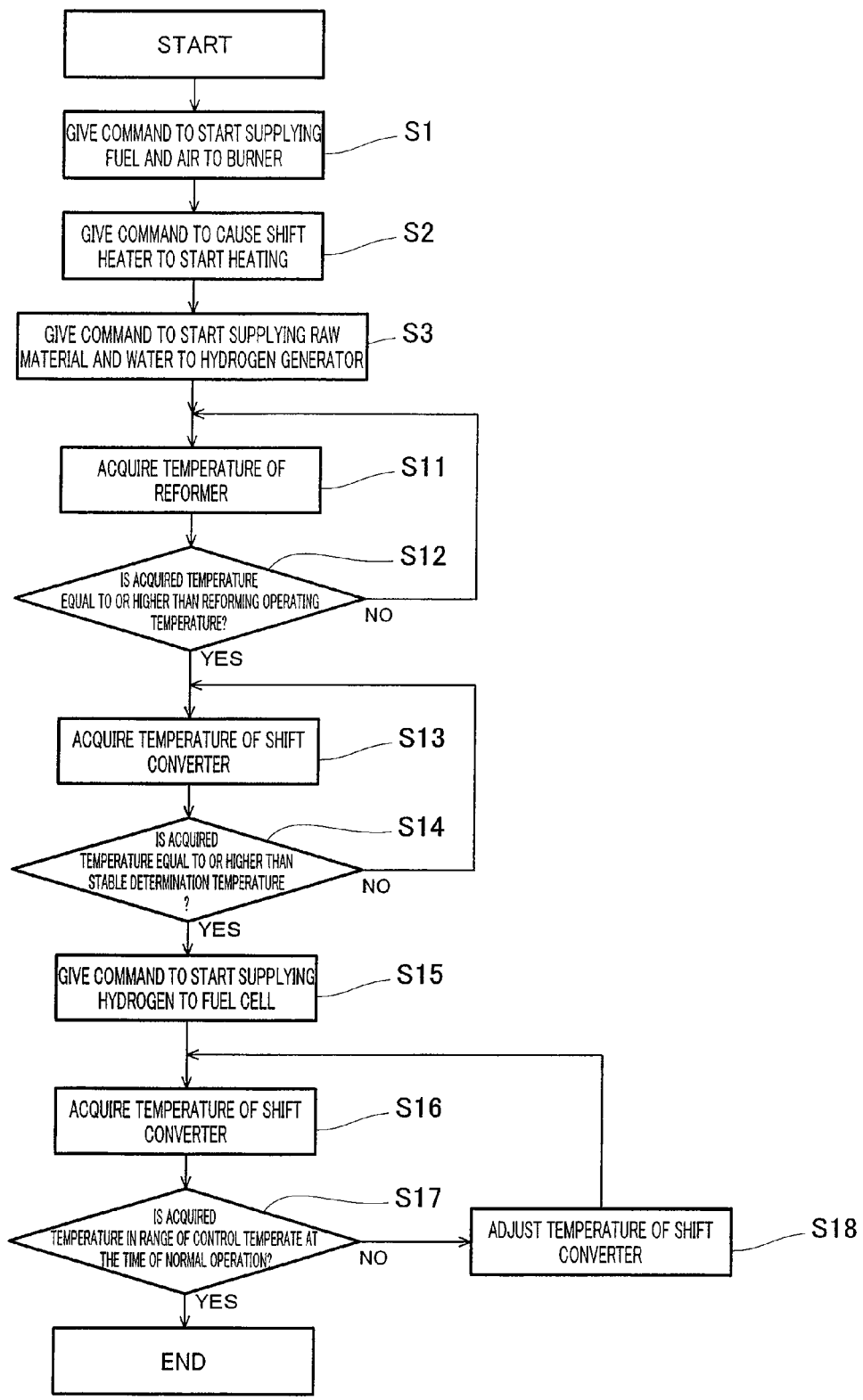
FIG. 6 is a flow chart schematically showing a content of the fuel cell system start-up operation program stored in the control unit of the fuel cell system shown in FIG. 5.

FIG. 6 is a flow chart schematically showing a content of a start-up operation program of the hydrogen generator 1a stored in the control unit 7.

First, the central processing unit 21 of the control unit 7 carries out Steps S1 to S3, and then proceeds to Step S11.

In Step S11, the central processing unit 21 acquires the temperature of the reformer 13 detected by the reforming temperature detector 55. Then, the central processing unit 21 compares the acquired temperature of the reformer 13 with a reforming operating temperature stored in the storage section 23. When the acquired temperature is lower than the reforming operating temperature, the process returns to Step S11, and Steps S11 and S12 are repeatedly carried out until the temperature of the reformer 13 becomes the reforming operating temperature or higher. When the temperature of the reformer 13 becomes the reforming operating temperature or higher, the process proceeds to Step S13.

Here, the reforming operating temperature is such a temperature of the reformer 13 that the hydrogen is adequately generated by the steam-reforming reaction between the supplied raw material and steam in the reformer 13. Moreover, the reforming operating temperature is set to a predetermined value and stored in the storage section 23.

In Step S13, the central processing unit 21 acquires the temperature of the shift converter 14 from the shift temperature detector 47. Then, the central processing unit 21 compares the stable determination temperature stored in the storage section 23 with the temperature of the shift converter 14 acquired in Step S13 (Step S14). When the acquired temperature of the shift converter 14 is lower than the stable determination temperature, the process returns to Step S13. Steps S13 and S14 are repeatedly carried out until the temperature of the shift converter 14 becomes the stable determination temperature or higher. When the acquired temperature of the shift converter 14 becomes the stable determination temperature or higher, the process proceeds to Step S15.

In Step S15, the central processing unit 21 gives a command to the passage switching valve 8 to switch to the passage connected to the fuel cell 4 as the passage of the fuel gas. Thus, the fuel cell 4 generates electric power. Then, the central processing unit 21 acquires the temperature of the shift converter 14 from the shift temperature detector 47 again (Step S16), and determines whether or not the acquired temperature of the shift converter 14 is in the range of the control temperature (Step S17). When the acquired temperature of the shift converter 14 is not in the range of the control temperature, the process proceeds to Step S18. In Step S18, the central processing unit 21 gives a command to the shift heater 46 to adjust the temperature of the shift converter to be in the range of the control temperature. Steps S16 to S18 are repeatedly carried out until the temperature of the shift converter 14 becomes in the range of the control temperature. When the temperature of the shift converter 14 becomes in the range of the control temperature, the start-up operation program is terminated.

As above, the fuel cell system 100a of Modification Example 1 controls to start supplying the hydrogen from the hydrogen generator 1 to the fuel cell 4 after confirming satisfaction of such conditions that the temperature of the shift converter 14 is the stable determination temperature or higher, and in addition, the detected temperature of the reformer 13 is equal to or higher than the reforming operating temperature at which an adequate amount of hydrogen can be generated. As above, the hydrogen-containing gas delivered from the hydrogen generator 1a is controlled to be supplied to the fuel cell 4 in consideration that at least the above temperature condition regarding the shift converter 14 is satisfied, and in addition, in consideration of whether or not the other device (the reformer 13 in the present example) in the hydrogen generator 1a is in a stable state. With this, the start-up time of the fuel cell system 100a can be shortened, and the stability at the start of the electric power generating operation can be secured.

Embodiment 2

Next, the fuel cell system 100 according to Embodiment 2 of the present invention will be explained. The basic configuration of the fuel cell system according to Embodiment 2 is the same as that of the fuel cell system 100 according to Embodiment 1, so that an explanation thereof is omitted.

During a stop period of the fuel cell system 100, that is, when the raw material and the water are not supplied, outside air may get into the shift catalyst layer 45 due to a pressure difference and temperature difference between the hydrogen generator and the outside air. The copper-zinc catalyst used as the catalyst is oxidized by the air to deteriorate its catalyst performance. Especially when the temperature is low, a reaction activity is insufficient, and an influence of the decrease in the catalyst performance is strongly reflected. Therefore, even when the temperature of the shift catalyst becomes equal to or higher than the stable determination temperature set for the copper-zinc catalyst which is not yet degraded, the concentration of the carbon monoxide in the reformed gas may not be able to be decreased to the target low concentration depending on the degree of oxidative degradation.

Therefore, in the fuel cell system 100 according to Embodiment 2, the stable determination temperature of the shift converter 14 is increased in accordance with the degree of degradation of the shift catalyst degraded by the oxidation caused by the air mixed during the stop period, and the reformed gas whose carbon monoxide concentration is decreased to the target low concentration is supplied to the fuel cell 4.

First, the degradation and restore operation of the shift catalyst will be explained in reference to FIG. 7.

Figure 7:
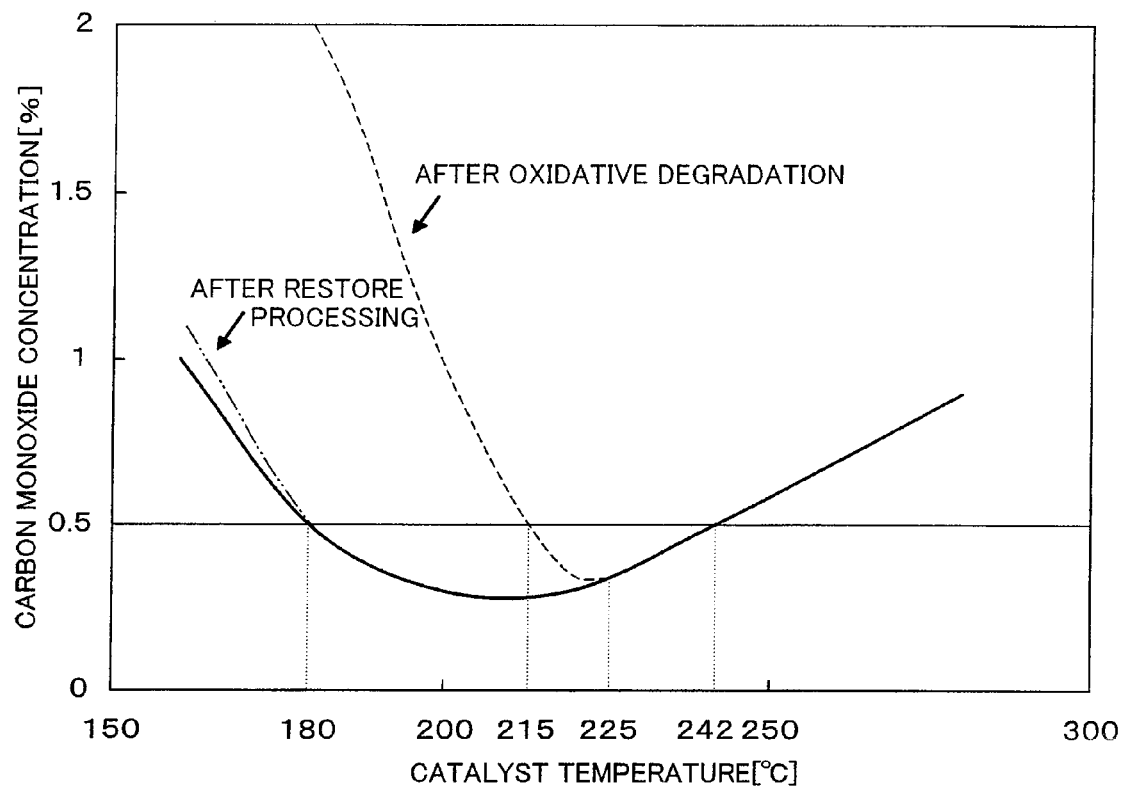
FIG. 7 shows results of an example of testing a catalyst characteristic (temperature characteristic) of the copper-zinc shift catalyst, degraded by the oxidation, with respect to temperatures using the fixed-bed flow device.

FIG. 7 shows results of an example of testing a catalyst characteristic of the copper-zinc shift catalyst (produced by Süd-Chemie), degraded by the oxidation, with respect to temperatures using the fixed-bed flow device as with FIG. 3. In FIG. 7, a solid line denotes a result obtained by measuring the catalyst characteristic (temperature characteristic) of the copper-zinc shift catalyst, which is not yet subjected to the oxidative degradation processing (in an initial period), with respect to the temperatures, a broken line denotes a result obtained by measuring the temperature characteristic of the copper-zinc shift catalyst which has been subjected to the oxidative degradation processing, and a dashed line denotes a result obtained by measuring again the temperature characteristic of the copper-zinc shift catalyst (having been subjected to restore processing at 225° C.) which has been subjected to the oxidative degradation processing to measure the temperature characteristic.

The fixed-bed flow device was supplied at the space velocity (SV) of 1,000/hour with the hydrogen-containing gas which contains 35% of steam and consists of 10% of carbon monoxide, 10% of carbon dioxide and 80% (dry gas basis) of hydrogen gas so that the S/C was set to 3 based on an assumption that the reforming reaction was carried out. The oxidative degradation processing was carried out as follows: after the temperature characteristic of the copper-zinc shift catalyst was measured, the hydrogen-containing gas was kept on being supplied while maintaining the shift catalyst at 400° C. and the air was kept on being supplied at the SV of 50/hour for an hour, so that the shift catalyst was degraded by the oxidation at an accelerated rate, and the shift catalyst became in an oxidative degradation state corresponding to a state at the time of stopping for a long period of time.

As shown in FIG. 7, in the case of oxidizing the shift catalyst by the air, the influence of the decrease in the catalyst performance by the degradation is strongly reflected at low temperature as shown by the broken line, so that the concentration of the carbon monoxide in the hydrogen-containing gas cannot be decreased to the target concentration. Therefore, it is necessary to determine (set again) the stable determination temperature for the degraded catalyst by obtaining, through an experiment, a temperature at which the concentration of the carbon monoxide in the hydrogen-containing gas having flowed through the shift catalyst having been degraded by the oxidation becomes the target concentration (0.5% for example) or lower. However, the catalyst characteristic of the shift catalyst restores as shown by the dashed line of FIG. 7 by increasing the temperature of the shift catalyst in an atmosphere of a reducing gas, such as the reformed gas. This is because when the temperature increases, the oxidized copper-zinc catalyst is reduced by the hydrogen contained in the reformed gas, so that the catalyst characteristic can be performed. Since the shift catalyst is usually maintained at high temperature in a reduction atmosphere at the time of start-up and operation, the catalyst performance restores as shown by the dashed line by the operation after stopping for a long period of time. Therefore, in the next start-up operation, the stable determination temperature is set again in accordance with the stable determination temperature set based on the temperature characteristic of the restored shift catalyst and the stop period until the next start-up operation. Thus, the quick start-up operation corresponding to the current catalyst characteristic can be carried out.

Although the catalyst characteristic of the shift catalyst degraded by the oxidation restores by increasing the temperature of the shift catalyst, the degree of degradation of the shift catalyst varies depending on how long the shift catalyst is oxidized. Therefore, in the fuel cell system 100 according to Embodiment 2, the stable determination temperature is changed in accordance with an operation stop period of the fuel cell system as shown in, for example, FIG. 8.

Here, the operation stop period of the fuel cell system is a period from when the fuel cell system in which the hydrogen is supplied from the hydrogen generator to the fuel cell and the fuel cell generates electric power stops until when the fuel cell system starts the start-up operation again.

Figure 8:
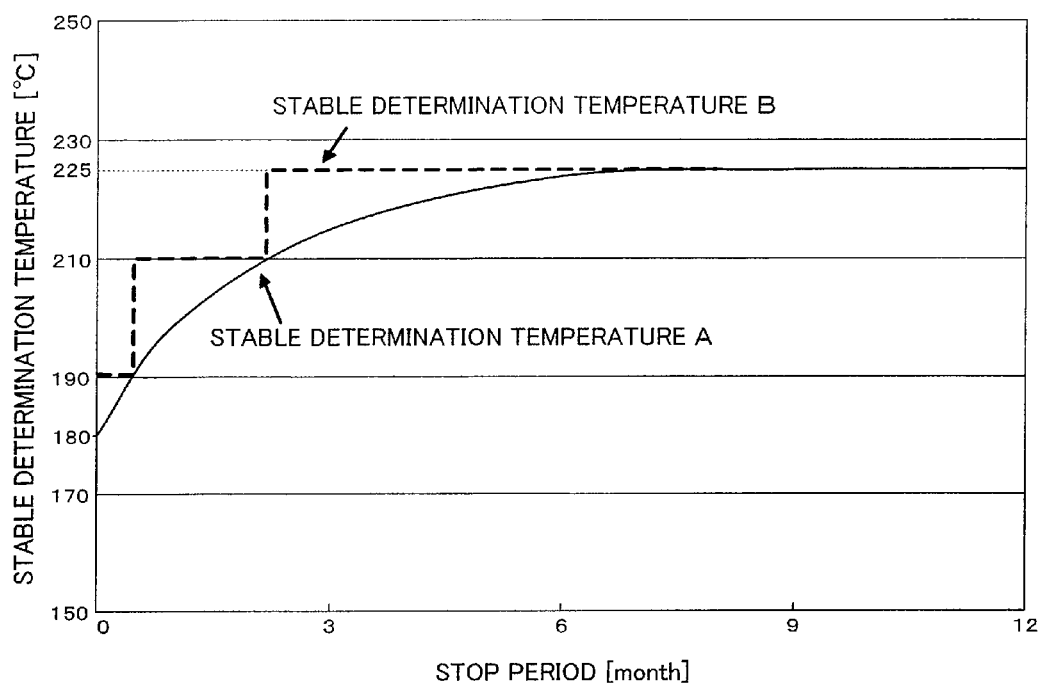
FIG. 8 is a graph showing a relation between a stable determination temperature and a stop period in the fuel cell system according to Embodiment 2 of the present invention.

FIG. 8 is a graph showing a relation between the stable determination temperature and the stop period in the fuel cell system 100 according to Embodiment 2. In FIG. 8, a stable determination temperature A shown by a solid line is an example in a case where the stable determination temperature is continuously changed in accordance with the stop period (in accordance with the degree of oxidative degradation of the shift catalyst), and a stable determination temperature B shown by a broken line is an example in a case where the stable determination temperature is non-continuously changed in accordance with the stop period, and in this case, the stable determination temperature becomes higher than the temperature at which the degradation of the shift catalyst can be restored. As in the case of the stable determination temperature A, it is desirable to continuously change the stable determination temperature in accordance with the stop period. However, even if the stable determination temperature is simply changed as in the case of the stable determination temperature B, the effects of the invention can be obtained.

In the initial period in which the air is mixed in the hydrogen generator, first, the oxidation of the surface of the shift catalyst proceeds. Therefore, the decrease in the shift catalyst characteristic proceeds quickly. However, the oxidation inside the shift catalyst does not proceed until the mixed air spreads inside the catalyst. Therefore, the decrease in the shift catalyst characteristic slows down after the surface of the shift catalyst is oxidized. On this account, even if the shift catalyst is subjected to the air for a long period of time, the decrease in the catalyst characteristic tends to be saturated. Therefore, in the present embodiment, as shown in FIG. 8, when the operation stop period of the fuel cell system is long, the stable determination temperature is set so as to be saturated. The stable determination temperatures A and B are associated with the stop period to be stored in the storage section 23 of the control unit 7.

Next, the start-up operation of the fuel cell system 100 according to Embodiment 2 will be explained in reference to FIG. 9.

Figure 9:
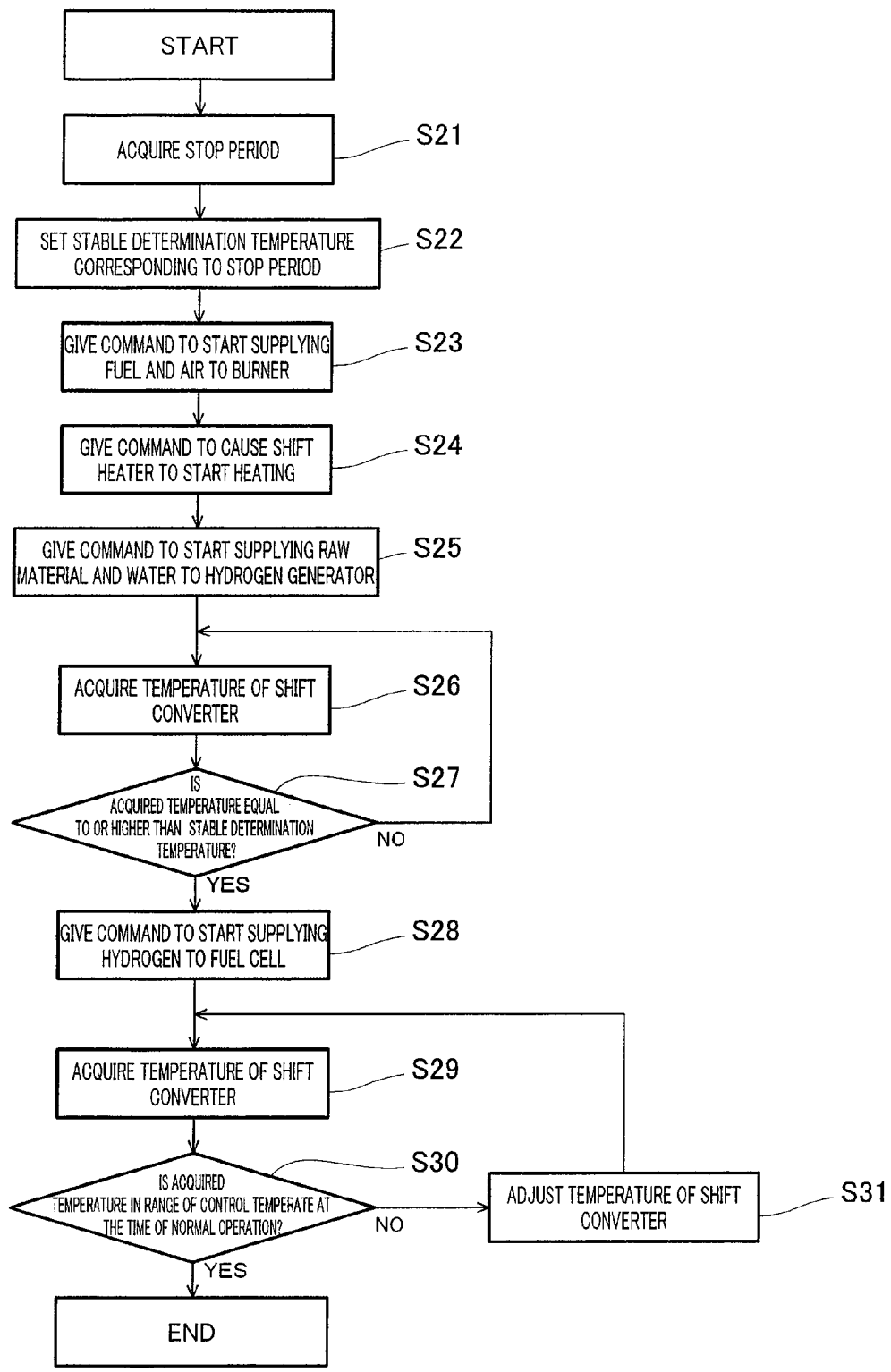
FIG. 9 is a flow chart schematically showing a content of the fuel cell system start-up operation program stored in the control unit of the fuel cell system according to Embodiment 2 of the present invention.

FIG. 9 is a flow chart schematically showing a content of the start-up operation program of the hydrogen generator 1 stored in the control unit 7.

First, the central processing unit 21 of the control unit 7 acquires from a timer section (not shown) the stop period that is a period from when the previous operation of the fuel cell system is stopped (Step S21). Then, the central processing unit 21 acquires and sets the stable determination temperature which is stored in the storage section 23 and corresponds to the stop period (Step S22).

Next, although the central processing unit 21 gives a command to the material feed device 2 to supply the raw material as the combustion fuel from the material feed device 2 to the burner 52 and a command to the sirocco fan 53 to supply the combustion air from the sirocco fan 53 to the burner 52 (Step S23), these steps and the following steps (Steps S23 to S31) are the same as Steps S1 to S9 of FIG. 4, so that explanations thereof are omitted.

As above, in the fuel cell system according to Embodiment 2, by changing the stable determination temperature in accordance with the degree of oxidative degradation of the shift catalyst (in accordance with the stop period of the fuel cell system), the concentration of the carbon monoxide in the hydrogen-containing gas having flowed through the shift catalyst can be surely decreased to the upper limit concentration or lower of the shift catalyst which can be supplied to the fuel cell 4. Thus, such hydrogen-containing gas can be supplied to the fuel cell 4.

In the fuel cell system of the present invention, it is preferable that the control temperature be, for example, a temperature in a ⅓ higher temperature range (herein, from 225° C. to 242° C.) of such an entire temperature range that the concentration of the carbon monoxide in the hydrogen-containing gas can be decreased by the shift converter 14 to the upper limit concentration (0.5% for example) or lower of the hydrogen-containing gas which can be supplied to the fuel cell 4. To be specific, it is preferable that in the entire temperature range in which the concentration of the carbon monoxide can be decreased, the control temperature be not lower than a temperature at which the carbon monoxide of the shift catalyst degraded by the oxidation can be decreased to the same degree as the carbon monoxide of the shift catalyst (catalyst not degraded by the oxidation) in the initial period and not higher than the upper limit temperature of the entire temperature range in which the concentration of the carbon monoxide can be decreased. With this setting of the control temperature, as shown in FIG. 7, even if the shift catalyst is degraded by the oxidation, the concentration of the carbon monoxide in the hydrogen-containing gas can be decreased adequately to the upper limit concentration or lower of the shift catalyst which can be supplied to the fuel cell 4. Thus, the fuel cell system can be operated safely.

In contrast, in order to shorten the start-up time of the fuel cell system, as shown in FIG. 7, it is preferable that the stable determination temperature be a temperature which is lower than the control temperature and is in a lower temperature range (herein, not lower than 180° C. and lower than 225° C.) that is the entire temperature range except for the ⅓ higher temperature range of the entire temperature range in which the concentration of the carbon monoxide can be decreased to the upper limit concentration (0.5% for example) or lower of the shift catalyst which can be supplied to the fuel cell 4 (to be specific, it is preferable that in the entire temperature range in which the concentration of the carbon monoxide can be decreased, the stable determination temperature be not lower than the lower limit temperature of the entire temperature range in which the concentration of the carbon monoxide can be decreased and lower than the control temperature). Moreover, as shown in FIG. 8, it is more preferable that the stable determination temperature be changed (set again) to a higher temperature in the above temperature range (that is the entire temperature range except for the ⅓ higher temperature range) in accordance with the degree of oxidative degradation of the shift catalyst.

The embodiments of the present invention have explained that the temperatures detected by the reformer 13, the shift converter 14 and the purifier 15 are directly detected as physical quantities (for example, the temperatures are directly measured by the temperature sensors, such as the thermocouple and the thermistor). However, the present embodiments are not limited to this, and the temperatures may be detected indirectly (other than the temperature, physical quantity or time related to the temperature of a detection target may be detected, for example, the pressure inside the shift converter or the operating time of the hydrogen generator may be detected).

Moreover, in the present invention, the delivery of the hydrogen-containing gas from the hydrogen generator 1 to the fuel cell 4 does not start when at least the temperature of the shift converter 14 is not the stable determination temperature or higher. However, this means that only the temperature of the shift converter 14 may be detected and the control unit 7 may determine whether or not the delivery of the hydrogen-containing gas is started. Moreover, as shown in Modification Example 1, this means that the temperature of the reformer 13 and the temperature of the purifier 15 may also be considered.

From the foregoing explanation, many modifications and other embodiments of the present invention are obvious to one skilled in the art. Therefore, the foregoing explanation should be interpreted only as an example, and is provided for the purpose of teaching the best mode for carrying out the present invention to one skilled in the art. The structures and/or functional details may be substantially modified within the spirit of the present invention.

INDUSTRIAL FIELD OF THE INVENTION

The fuel cell system of the present invention is useful as a fuel cell system capable of shortening the start-up time by setting the temperature of the shift catalyst at the time of starting supplying hydrogen from the hydrogen generator to fuel cell to the stable determination temperature that is lower than the temperature at the time of the normal operation. Moreover, the fuel cell system of the present invention is useful as a fuel cell system capable of surely restoring the performance of the shift catalyst since the stable determination temperature is changed in accordance with the degree of degradation of the shift catalyst.

The invention claimed is:

1. A fuel cell system comprising:
a hydrogen generator including a reformer which has a reforming catalyst and carries out a reforming reaction using the reforming catalyst to generate a hydrogen-containing gas from a raw material, a shift converter which has a shift catalyst and carries out a shift reaction using the shift catalyst to decrease carbon monoxide in the hydrogen-containing gas, and a first temperature detector which detects a temperature of the shift converter;
a fuel cell which uses the hydrogen-containing gas delivered from the hydrogen generator, to generate electric power;
a timer; and
a control unit including a processor and a memory storing a program, the program, when executed by the processor, causing the processor:
not to start delivering the hydrogen-containing gas from the hydrogen generator to the fuel cell when at least the temperature of the shift converter detected by the first temperature detector is not a stable determination temperature or higher; and
to acquire an operation stop period of the fuel cell from the timer and change the stable determination temperature by utilizing the acquired operation stop period, wherein:
the stable determination temperature being lower than a control temperature of the shift converter at the time of a normal operation, and
the operation stop period is an elapsed time period from a stop of a previous operation of the fuel cell system.

2. The fuel cell system according to claim 1, further comprising a storage unit which is adapted to store the stable determination temperature corresponding to the operation stop period, wherein
the program of the control unit further causes the processor to, after determining the operation stop period, change the stable determination temperature to a stable determination temperature, which corresponds to the determined operation stop period, based on a correspondence between the operation stop period stored in the storage unit and the stable determination temperature.

3. The fuel cell system according to claim 1, wherein the shift catalyst is configured to contain copper or zinc.

4. The fuel cell system according to claim 1, further comprising a second temperature detector which detects a temperature of the reformer, wherein
the program of the control unit further causes the processor not to start delivering the hydrogen-containing gas from the hydrogen generator to the fuel cell when the temperature of the reformer detected by the second temperature detector is not a reforming operating temperature or higher.

5. The fuel cell system according to claim 1, wherein the stable determination temperature is such a temperature of the shift converter that a concentration of the carbon monoxide in the hydrogen-containing gas is able to be decreased by the shift converter to an upper limit concentration or lower of the hydrogen-containing gas which is able to be supplied to the fuel cell.

6. The fuel cell system according to claim 1, wherein:
the control temperature is a temperature in a $\frac{1}{3}$ higher temperature range of such an entire temperature range that a concentration of the carbon monoxide in the hydrogen-containing gas is able to be decreased by the shift converter to an upper limit concentration or lower of the hydrogen-containing gas which is able to be supplied to the fuel cell; and
the stable determination temperature is a temperature in a lower temperature range that is the entire temperature range except for the $\frac{1}{3}$ higher temperature range.

7. The fuel cell system according to claim 1, wherein:
the control temperature is higher than a temperature at which a concentration of the carbon monoxide in the hydrogen-containing gas becomes minimum, in such an entire temperature range that the concentration of the carbon monoxide in the hydrogen-containing gas is able to be decreased by the shift converter to an upper limit concentration or lower of the hydrogen-containing gas which is able to be supplied to the fuel cell; and
the stable determination temperature is lower than the temperature at which the concentration of the carbon monoxide in the hydrogen-containing gas becomes minimum.

* * * * *